Nov. 27, 1934.  V. GANDRUP ET AL  1,982,157
AGRICULTURAL IMPLEMENT
Filed Sept. 30, 1933
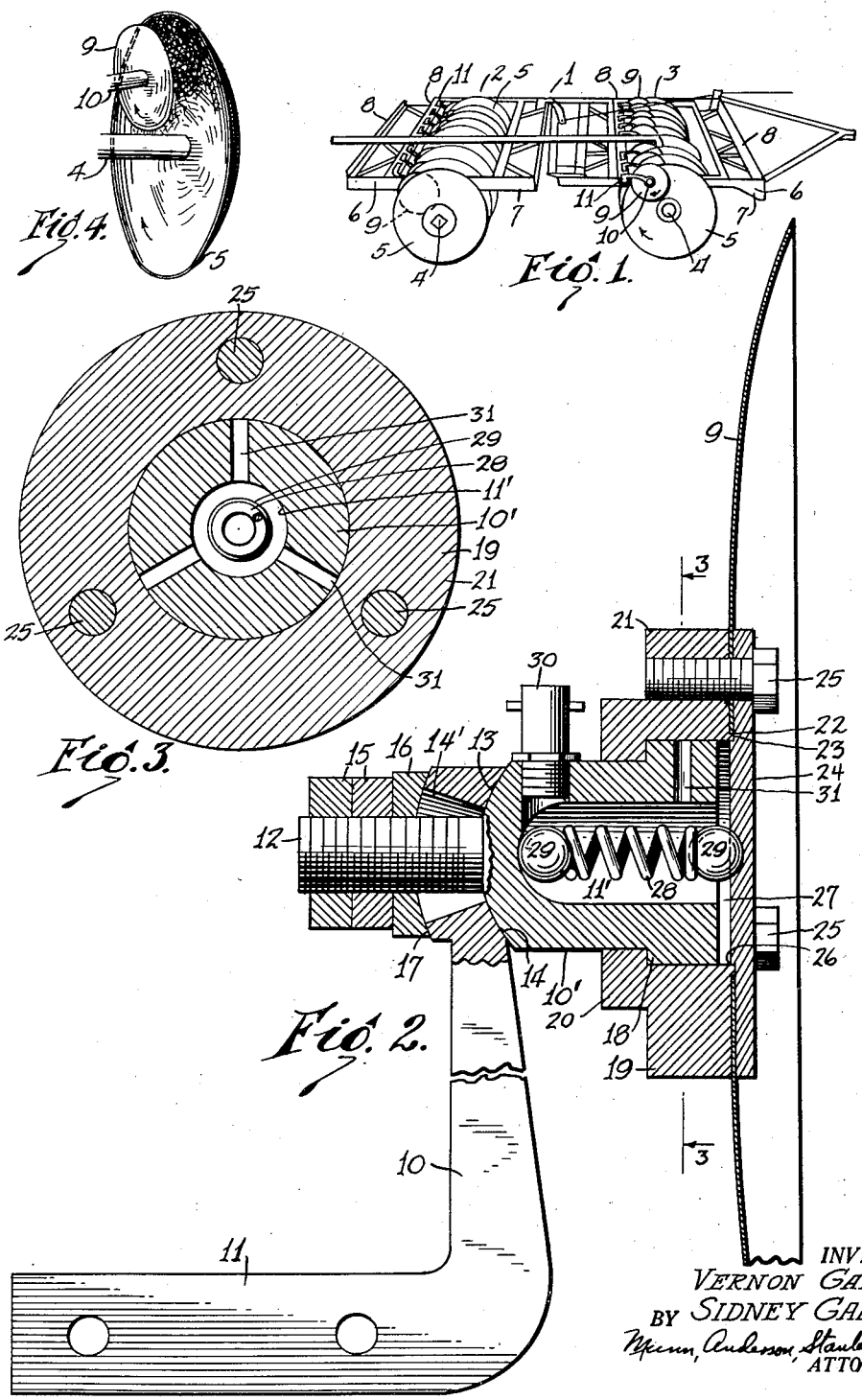
INVENTORS
VERNON GANDRUP
SIDNEY GANDRUP
BY
ATTORNEYS.

Patented Nov. 27, 1934

1,982,157

UNITED STATES PATENT OFFICE 1,982,157

AGRICULTURAL IMPLEMENT

Vernon Gandrup and Sidney Gandrup, Watsonville, Calif.

Application September 30, 1933, Serial No. 691,674

4 Claims. (Cl. 97—223)

The present invention relates to improvements in agricultural implements, and more particularly to those in which discs are employed for breaking up the ground surface as, for instance, disc plows and disc cultivators.

The principal object of the present invention is to provide means for scraping the disc employed in an agricultural implement of the character described so that the surface of the disc is maintained in a clean condition, and the disc may be permitted to perform its task with greater efficiency.

More particularly it is proposed to provide a scraping attachment for the disc of an agricultural implement, the scraper comprising a smaller disc which is placed in juxtaposition to the main disc, and is slightly tilted relative to the main disc so that the lower edge of the scraper disc cuts against the face of the main disc.

It is further proposed in the present invention to provide a mounting means for the scraper disc which is arranged to yieldingly urge the scraper disc upon the surface of the main disc, and which provides for freedom of revolving motion, whereby the scraping action is rendered more effective.

It is further proposed to provide in combination with the mounting means a means for lubricating the disc bearing in such a manner that the bearing is kept free from dust and other impurities.

It is further proposed to provide a disc mounting which allows the position of the scraper disc relative to the main disc to be adjusted so as to obtain the proper tilting position.

Further objects and advantages of our invention will appear as the specification proceeds.

The preferred form of our invention is illustrated in the accompanying drawing, in which Figure 1 shows a perspective view of a conventional disc harrow having our scrapers attached thereto;

Figure 2 is a horizontal section through the disc mounting;

Figure 3 a vertical transverse section taken along line 3—3 of Figure 2; and

Figure 4 a diagrammatic perspective view showing the scraper disc in position relative to the main disc.

While we have shown only the preferred form of our invention, we wish to have it understood that various changes or modifications may be made within the scope of the claims hereto attached without departing from the spirit of the invention.

In Figure 1 is shown a conventional disc harrow 1 consisting of two sections 2 and 3, each section comprising a shaft 4 on which a suitable number of cultivating discs 5 are supported, the shaft in turn supporting a frame 6 comprising longitudinal frame members 7 and transverse frame members 8. One of these transverse frame members 8 is disposed directly behind the discs and this frame member is used by us as a supporting means for our disc scrapers 9, which are revolvably mounted in arms 10 fastened to the transverse frame members 8 as at 11. The scraper discs are supported relative to the main discs so as to engage with the upper rear quarter of the main disc, the scraper discs being preferably slightly tilted so that only the lower edge of the scraper disc is in contact with the inner face of the main disc.

The mounting employed for the scraper disc 9 is shown in detail in Figures 2 and 3, and comprises a bolt 10' which is hollow through a portion thereof, to provide a chamber 11', and which has a threaded extension 12 of reduced diameter so as to form a shoulder 13 which is made spherical and which is adapted to seat against a spherical seat 14 provided in the arm 10. When the shoulder is seated, the reduced extension 12 extends through a frusto-conical aperture 14' in the arm and the bolt is held in adjusted position by means of nuts 15, a washer 16 being interposed between the nuts and the arm, and the confronting faces of the washer 16 and the arm being also made spherical as shown at 17. It will be seen that due to this arrangement the bolt may be adjusted, within certain limits, to any desired angularity relative to the arm and may be firmly clamped in adjusted position.

The bolt is provided at its outer end with a flange 18, and a fitting 19 is slidable on this flange, and is formed with an inner flange 20 which when contacting the flange 18 limits the outward movement of the fitting. The fitting is also provided with an outer flange 21 against the outer face of which the disc 9 is made to lie, the disc being formed with a central aperture as at 22, which is slightly larger than the aperture of the fitting so that a small tongue 23 of the fitting, annular in shape, fits inside the aperture of the disc and holds the latter against movement in radial direction.

A plate 24 fits against the inner face of the disc in juxtaposition to the fitting, and is secured to the flange 21 by a series of bolts 25, the plate being formed with a central projection 26, which fits inside of the tongue 23 whereby any radial play of the plate is effectively eliminated.

As has been pointed out before, the fitting is slidable on the bolt and a certain amount of space indicated at 27 is provided between the plate 24 and the outer end of the bolt so that the disc is free to move toward the bolt in case such movement is occasioned by particles of rock or other hard substances crowding between the scraper and the main disc, but this movement is yieldingly opposed by a spring 28 provided inside of the chamber 11 and bearing against one end of the chamber and the plate 24 through balls 29.

A lubricant is admitted into the hollow bolt through a conventional alemite or similar fitting 30, and the lubricant is guided to the bearing surfaces between the bolt 10' and the fitting 19 through radial ports 31.

The manner of using the scraper will be readily understood from the foregoing description. The scraper arms are first secured to the transverse members 8 of the disc cultivator, or to corresponding members of a disc plow so as to bring the free end of the arm in opposite relation to the inner face of each disc. The bolt 10' is then adjusted relative to the arm so as to cause the scraper disc to occupy a slanting position with the lower edge of the scraper disc contacting the main disc. The spring 28 normally holds the lower or cutting edge of the scraper disc against the main disc in case particles of hard material should crowd between the two discs. As the cultivator is drawn over the ground surface, any dirt that accumulates on the inner face of the main disc will be removed by the scraper discs, which latter in itself will, due to friction, have a slight revolving motion in the direction indicated by the arrow so as to feed the scraped-off material outwardly.

We claim:

1. A disc scraper mounting comprising an arm having a spherical seat, a bolt having a spherical shoulder fitting the seat, means for clamping the bolt upon the seat, a fitting slidable on the bolt and having the disc secured thereto, yielding means for urging the disc outward and means for limiting the outward movement of the disc.

2. A disc scraper mounting comprising an arm having a spherical seat and a central aperture leading to the same, a bolt having a spherical shoulder fitting the seat and a reduced extension passing through the aperture, means engaging the extension for clamping the shoulder upon the seat, a fitting slidable on the bolt and having the disc secured thereto, yielding means for urging the disc outward and means for limiting the outward movement of the disc.

3. A disc scraper mounting comprising an arm having a spherical seat and a central aperture leading to the same, a hollow bolt having a spherical shoulder fitting the seat and a reduced extension passing through the aperture, means engaging the extension for clamping the shoulder upon its seat, a fitting slidable on the bolt and having an external flange lying against one face of the disc, a plate on the other side of the disc in juxtaposition to the flange, means for fastening the plate to the flange, spring means within the hollow bolt for urging the plate and the disc outwardly and coacting flanges on the bolt and the fitting for limiting the outward movement of the disc.

4. A disc scraper mounting comprising an arm having a spherical seat and a central aperture leading to the same, a hollow bolt having a spherical shoulder fitting the seat and a reduced extension passing through the aperture, means engaging the extension for clamping the shoulder upon its seat, a fitting slidable on the bolt and having an external flange lying against one face of the disc, a plate on the other side of the disc in juxtaposition to the flange, means for fastening the plate to the flange, spring means within the hollow bolt for urging the plate and the disc outwardly and coacting flanges on the bolt and the fitting for limiting the outward movement of the disc, with means for admitting a lubricant into the hollow bolt and from there to the contacting surfaces of the bolt and the fitting.

VERNON GANDRUP.
SIDNEY GANDRUP.